US006358588B1

(12) United States Patent
Edwards et al.

(10) Patent No.: US 6,358,588 B1
(45) Date of Patent: Mar. 19, 2002

(54) TAGS HAVING A METALLIC HEFT AND APPEARANCE AND PROCESS FOR MAKING THEM

(75) Inventors: Linda M. Edwards, Hubertus; Joseph C. Musto, Shorewood; Susan M. Babb, Pewaukee, all of WI (US)

(73) Assignee: Brady Worldwide, Inc., Milwaukee, WI (US)

(*) Notice: Subject to any disclaimer, the term of this patent is extended or adjusted under 35 U.S.C. 154(b) by 0 days.

(21) Appl. No.: 09/165,659

(22) Filed: Oct. 3, 1998

(51) Int. Cl.$^{7}$ .............................................. B32B 33/00

(52) U.S. Cl. ...................... 428/42.2; 283/81; 428/40.1; 428/40.9; 428/41.6; 428/42.1; 428/42.2; 428/914

(58) Field of Search .............................. 428/40.1, 40.9, 428/41.6, 42.1, 914, 42.2; 283/81

(56) References Cited

U.S. PATENT DOCUMENTS

| | | | | | |
|---|---|---|---|---|---|
| 4,068,028 | A | | 1/1978 | Samonides | 428/40 |
| 4,567,072 | A | | 1/1986 | Brainard et al. | 428/40 |
| 4,643,454 | A | | 2/1987 | Ondis | 283/74 |
| 4,678,690 | A | | 7/1987 | Palmer et al. | 428/31 |
| 5,042,842 | A | | 8/1991 | Green et al. | 283/101 |
| 5,085,918 | A | * | 2/1992 | Rajan | 428/195 |
| 5,225,267 | A | | 7/1993 | Ochi et al. | 428/214 |
| 5,284,688 | A | | 2/1994 | Hiatt | 428/40 |
| 5,328,738 | A | | 7/1994 | McKillip et al. | 428/40 |
| 5,508,105 | A | * | 4/1996 | Orensteen | 428/323 |
| 5,518,787 | A | | 5/1996 | Konkol | 428/43 |
| 5,609,945 | A | | 3/1997 | von Trebra et al. | 428/209 |
| 5,665,443 | A | * | 9/1997 | Hata | 428/34.9 |
| 5,670,005 | A | | 9/1997 | Look et al. | 156/230 |
| 5,683,774 | A | | 11/1997 | Faykish et al. | 428/40.1 |
| 5,759,727 | A | | 6/1998 | Malhotra | 430/97 |
| 5,773,112 | A | | 6/1998 | Tachikawa et al. | 428/40.1 |
| 5,984,363 | A | * | 11/1999 | Dotson | 283/61 |
| 6,024,455 | A | * | 2/2000 | O'Neill | 359/530 |

* cited by examiner

*Primary Examiner*—Nasser Ahmad
(74) *Attorney, Agent, or Firm*—Whyte Hirschboeck Dudek SC

(57) ABSTRACT

Tags having a metallic heft and processes for making them are described in which a first resin-based thermal mass transfer printer image is applied to a metallized polymer film, with or without an intervening translucent print receptive layer, and then a second resin-based thermal mass transfer printer image is applied to at least a portion of the first resin-based thernal mass transfer printer image. The first resin-based thermal mass transfer printer image has an opaque first color and the second resin-based thermal mass transfer printer image has an opaque second color, the opaque second color preferably selected to contrast with the first opaque color. These tags are useful as replacements for anodized aluminum asset tags, which are more difficult and expensive to produce and do not lend themselves to printing computer-generated indica such as a series of different bar codes. The disclosed and described tags can be cost-effectively manufactured in small quantities and yet have such variable indica.

28 Claims, 1 Drawing Sheet

TAGS HAVING A METALLIC HEFT AND APPEARANCE AND PROCESS FOR MAKING THEM

BACKGROUND OF THE INVENTION

1. Field of the Invention

The present invention relates to the manufacture of tags, particularly asset tags having a metallic heft and appearance.

2. Description of Related Art

Anodized aluminum asset tags have become a well established means for identification of capital equipment belonging to facilities such as offices, medical treatment centers, laboratories, industrial production facilities, and mobile service providers. They are often applied to computer equipment, medical devices, laboratory instrumentation, and production machinery as a means of keeping track of such equipment for service, replacement and tax purposes; increasing the likelihood that theft would be detected; and simplifying insurance claims in the event of theft or loss. When applied by a manufacturer, such tags are useful for identification of the product for general product service, product warranty service and possible recall. The use of anodized aluminum asset tags for these end uses evolved from their sturdy metallic heft and appearance. Their sturdy metallic heft and appearance conveys a high perceived quality and, from a security standpoint, a sense of indestructibility and intent to enforce security measures. They are often perceived to be an essential component of responsible asset management.

One disadvantage of anodized aluminum asset tags is that on the one hand they are often only needed sporadically in small quantities while on the other hand they are not easy to manufacture in small production runs. Typically, anodized aluminum asset tags are manufactured by applying the required graphic and text information in reverse on the anodized aluminum substrate using conventional imaging processes such as screen printing, letterpress, and etching, all of which require the wasteful, time consuming and expensive step of making a master plate or screen for applying ink, or a mask in the case of etching, which must be stored for possible future use or destroyed after final use. The aluminum substrate having the required heft also requires the use of special printing, stamping, handling and die cutting equipment, which can undergo substantial wear and tear from contact with hard aluminum surfaces. There is also the cost of the aluminum itself to consider.

There is also an increasing desire to have variable information appear on asset tags such as a unique numeric or alphanumeric code associated with the records concerning the specific equipment to which it is attached, along with a corresponding bar code to minimize errors and worker time associated with entry of the same into a computer database. While printing of numeric sequences can be carried out using a mechanical device that automatically advances to the next number for each tag, such devices are not appropriate for generating a corresponding unique bar code. Generation of multiple varying bar codes generally requires a printer capable of producing computer-generated output, such as a mass transfer thermal printer, ink jet printer or electrophotographic printer. Such printers are generally not considered appropriate for use on anodized aluminum tag material.

Thus, there continues to be a need for asset tags having the heft and appearance of anodized aluminum asset tags and containing variable information that can be conveniently, quickly and inexpensively manufactured on demand using conventional printing, handling and die cutting equipment, which reduces the wear and tear on such equipment. The present invention overcomes these limitations.

SUMMARY OF THE INVENTION

One aspect of the present invention is an asset tag having a metallic heft and appearance comprising:

(A) A metallized polymer film having a front side and a back side, the front side optionally having a translucent print receptive layer;

(B) a first resin-based thermal mass transfer printer image covering a portion of the front side of the metallized polymer film such that at least one portion of the front side of the metallized polymer film is not covered by the first thermal mass transfer printer image; and (C) an optional second resin-based thermal mass transfer printer image covering at least a portion of the first resin-based thermal mass transfer printer image such that at least one portion of the first resin-based thermal mass transfer printer image is not covered by the second resin-based thermal mass transfer printer image, wherein the first resin-based thermal mass transfer printer image has a substantially opaque first color and the optional second resin-based thermal mass transfer printer image, when present, has a substantially opaque second color.

Another aspect of the present invention is a process for making an asset tag having a metallic heft and appearance comprising:

(A) Providing a metallized polymer film having a front side and a back side, the front side optionally having a translucent print receptive layer;

(B) Applying a first resin-based thermal mass transfer printer image having a substantially opaque first color to the front side of the metallized polymer film (A) such that at least one portion of the front side of the metallized polymer film (A) is not covered by the first thermal mass transfer printer image; and (C) Optionally applying a second resin-based thermal mass transfer printer image having a substantially opaque second color over the first thermal mass transfer printer image (B) such that at least one portion of the first thermal mass transfer printer image (B) is not covered by the second thermal mass transfer printer image.

The present invention also includes tags obtainable by the above process and intermediates for making the same.

DETAILED DESCRIPTION OF THE INVENTION

1. Metallized Polymer Film

Figure 1:
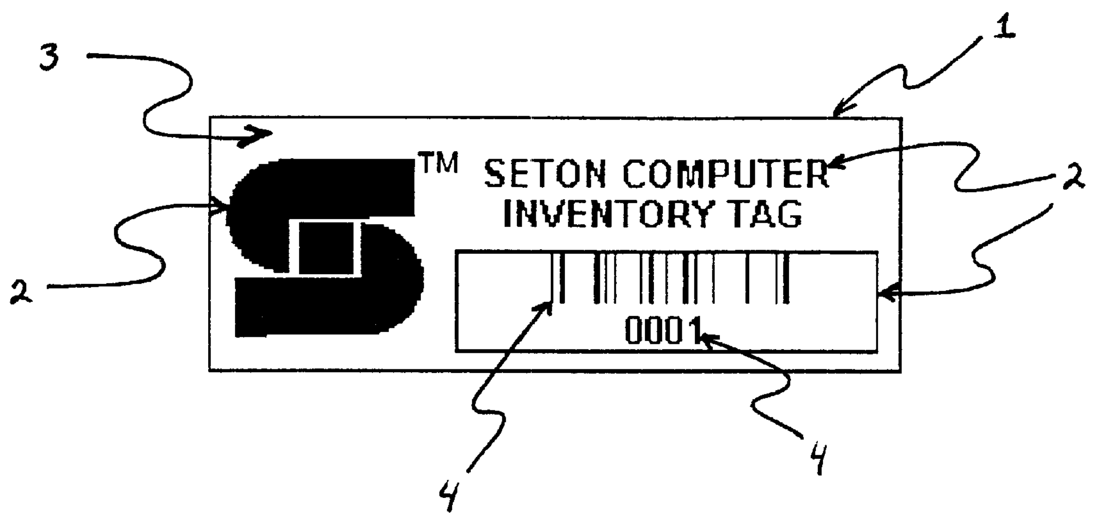
FIG. 1 is a front plan view of an asset tag according to the present invention and FIG. 2 is an enlarged, expanded, sectional, elevational view of the asset tag of an asset tag according to the present invention.

The starting point for the manufacture of the label having a metallic appearance according to the present invention is a metallized polymer film. Such metallized polymer films are commercially available and can also be manufactured according to processes known in the prior art. They comprise a transparent polymer film having a metallic layer evenly deposited on at least one side of the film.

The polymer film may be made of various transparent polymers, such as polyester, cellulose triacetate, cellulose diacetate, cellophane, biaxially oriented polypropylene, cast polypropylene, polyethylene, polystyrene, polycarbonate, polyvinyl alcohol, polyvinyl chloride, polyacrylate, polyurethane, and polyvinyl acetate. The thickness of the film is preferably at least about 0.001, more preferably at least about 0.003, and even more preferably at least about 0.0045, inches and preferably up to about 0.010, more preferably up to about 0.007, and even more up to about 0.0055, inches.

The metal layer may be selected from a variety of metals, such as aluminum, chromium, nickel, titanium, copper, gold, and silver; alloys of these metals; and compounds of these metals. Among these metals aluminum is preferred. The metals may be deposited by any known process, such as the vacuum vapor deposition process, the sputtering process, and the ion plating process. In the vacuum vapor deposition process, a metallic material for forming a layer by metal deposition and the polymer film are placed under a high vacuum as the metal is vaporized by heating above the surface of the film. Metal attaches to the surface of the film by condensation, forming a thin layer on the surface of the film. In the sputtering process, argon gas of low pressure is introduced into a chamber maintained under a high vacuum containing the polymer film and the metal is placed at a cathode within the chamber. Argon ions formed by a glow discharge generated by the cathode sputter the metal, which becomes attached to and accumulated on the surface of the polymer film to form the metal layer. In the ion plating process, the polymer film is placed on the cathode and the metal used for vaporization is placed on the anode. Particles of vaporized metal are ionized while the particles pass through glow discharge, causing ionized particles of metal to be adsorbed on the surface of the polymer film to form the metal layer. Those processes are conducted until sufficient metal is deposited on the polymer film to achieve a light transmissivity less than 20 percent, preferably less than 5 percent, even more preferably less than 3 percent, such as about 2 percent or less, or even more preferably about 1 percent or less, when measured according to Japanese Industrial Standard K 7105.

The thickness of the metal layer is preferably at least about 20, more preferably at least about 180, angstroms and preferably up to about 2000, more preferably up to about 230, angstroms.

In a preferred embodiment, the metallized polymer film also has a layer of adhesive material formed on the metallic layer. Any adhesive conventionally used for labels can be used. The adhesive is preferably pressure-sensitive. The thickness of the adhesive material is preferably in the range of about 4 to about 250 microns. A protective layer may be present between the metallic layer and the layer of adhesive material, such as an acrylic resin, a polyester resin, a polyurethane resin, or a vinyl acetate resin.

The preferred embodiment with the adhesive layer preferably has a release liner attached to the layer of adhesive material. The release liner may be selected from any of those known in the art, such as paper, coated paper, polyethylene, laminated paper, or polymer films having a coating of releasing agent, such as a silicone resin.

Examples of commercially available metallized polymer film include those sold by FLEXcon Company, Inc., such as MM-500 Silver P/T/P V-88 80B PFM which is a silver-colored metallized polyester material having a thickness of 0.005 inch plus a 0.0015 inch of pressure-sensitive adhesive and a 0.0045 inch thick liner on the back side of the film.

2. Optional translucent print receptive layer

The optional translucent print receptive layer is applied to the surface of the metallized polymer film when color matching is desired and/or when needed to improve the print receptivity of the metallized polymer film. If the metallized polymer film has an adhesive layer, the translucent print receptive layer is applied to the opposite side of the metallized polymer film. The translucent print receptive layer may contain a wide range of polymer resins and optional additives having sufficient functionality to provide compatibility, and preferably adhesion to, resin-based thermal mass transfer printer images.

In a preferred embodiment, the print receptive layer is obtainable by applying to the metallized polymer film a print receptive layer forming composition comprising at least one acrylic resin, optionally at least one colorant and optionally at least one curing agent, such as a composition comprising at least one acrylic resin, optionally at least one colorant, at least one polyester oligomer, at least one monomer and at least one photoinitiator. The colorant, when present, is preferably compatible with at least one resin comprising the translucent print receptive layer, and more preferably is miscible with at least one such resin. In one embodiment, the colorant is present when contrast between the first thermal mass transfer printer image and the metallized polymer film is desired and the metallized polymer film does not have a color which has the desired contrast with the color of the first thermal mass transfer printer image. The colorant may, for example, be a known pigment or dye. The print receptive layer preferably comprises an at least partially crosslinked polymer, which is obtainable by, for example, at least partially curing a composition comprising at least one polymer and at least one curing agent after it is applied to the metallized polymer film. The print receptive layer may be cured by any means compatible with the integrity of the film. Preferably, the print receptive layer forming composition is ultraviolet light ("UV") curable and is cured by exposure to UV light.

Such translucent print receptive resins may be obtained from Cavanaugh, Inc. A specific UV curable example sold by that company is CavFlex Plus UV Flexo.

As used herein, the term "translucent" means that the layer as applied has less than 0.5, preferably less than 0.2, and even more preferably less than 0.1, opacity. Preferably, the translucent resin layer has a light transmissivity of at least about 80, more preferably at least about 90, even more preferably at least about 95, and yet even more preferably at least about 98, percent of incident light.

3. First resin-based thermal mass transfer printer image

A first image is applied to the metallized polymer film, either with or without an intervening print receptive layer, using a resin-based thermal mass transfer printing system. A thermal mass transfer printing system generally comprises a means for selectively applying heat to the resin-based colorant/binder on a carrier so as to cause the resin-based colorant/binder to be transferred from the carrier to receiving surface adjacent to the resin-based colorant/binder. The resin-based colorant/binder carrier is generally a ribbon and the resin-based colorant/binder is defined herein as a colorant/binder in which at least 50 wt %, more preferably at least 80 wt %, of the binder is at least one resin. Preferably, less than 50 wt %, more preferably less than 20 wt % of the binder is wax. Waxes are distinguishable from resins by their low viscosity at just above their melting point and/or by their substantially lower degree of polymerization.

In particular, the resin-based colorant/binder is preferably made for use as spot color, as opposed to process color. Spot color colorant/binders are opaque colors designed to not mix with other colorant/binders applied over it. Process color colorant/binders are either relatively transparent or are intended to mix with other colorant/binders so that when two or more process color colorant/binders are applied they combine to produce a third color different from the color of any one of the individual process color colorant/binders.

The opacity of the applied spot color colorant/binders (i.e., the opacity of the first thermal mass transfer printer image) is preferably at least 0.90, more preferably at least 0.95, and even more preferably at least 0.98. The light transmissivity of these latter applied colorant/binders is preferably less than 0.1. Preferably, the specular reflectivity of the applied colorant/binder (i.e., the specular reflectivity of the first thermal mass transfer printer image) is less than 50 percent, more preferably less than 20 percent, and even more preferably less than 10 percent of the overall reflectivity of the applied colorant/binder. A low specular reflectivity is particularly desirable when a second thermal mass transfer printer image is applied over the first thermal mass transfer printer image that comprises a bar code. The low specular reflectivity aids in allowing the bar code to be read from a wide range of angles.

The term "specular reflection" is defined as "reflection without diffusion, in accordance with the laws of optical reflection, as in a mirror" in ASTM E 284-81*a*. "Diffusion" is defined in ASTM E 284-81*a* as "change of the angular distribution of a beam of radiant flux by a transmitting material or reflecting surface such that the flux incident in one direction is continuously distributed in many directions, the process not conforming (on a macroscopic scale) to the laws of Fresnell (regular) reflection and refraction and there being no change in frequency (wave length) of the monochromatic component of the flux."

When a second resin-based thermal mass transfer printer image will be applied over the first resin-based thermal mass transfer printer image, the applied colorant/binder preferably has a printed bar code readability edge contrast rating and a printed bar code readability symbol contrast rating of "A" or "B", more preferably "A", measured according to The American National Standards Institute (ANSI) Barcode Print Quality Guideline" (ANSX3.182-1990) using a Quick-Check 500 bar code verifier manufactured by PSC, Inc., of Webster, N.Y. (United States) set to have an aperture of 6 mil and a wavelength of 660 nm.

To enhance the appearance of the tag and improve the contrast between the first thermal mass transfer printer image and the underlying metallized polymer film, the first thermal mass transfer printer image preferably has a color which is of a lighter hue than the color of the metallized polymer film. This may be achieved not only by appropriate selection of the colorant used for the first thermal mass transfer printer image, but also by selection of the color of the metallized polymer film, with or without the optional translucent print receptive layer, as explained above.

Preferably the first thermal mass transfer printer image has metallic appearance. That objective can be achieved by, for example, selecting a colorant/binder having a finely divided metal, such as silver, preferably in the form of plates or flakes, as a colorant. When a second resin-based thermal mass transfer printer image will be applied over the first thermal mass transfer printer image, appropriate colorant/binder and printing conditions are preferably selected to obtain a first thermal mass transfer printer image edge contrast and/or symbol contrast as explained above.

In a preferred embodiment, the printing process uses a resin-based colorant/binder having a silver flake-containing colorant, such as Astro-Med RAA series of thermal mass transfer ribbons, such as Silver 3300 4508, commercially available from Astro-Med, Inc. This ribbon, which is said to have a Pantone 877 color, has a low specular reflectivity.

Thermal mass transfer printers are commercially available. Examples include those sold by Zebra Technologies, Astro-Med, Inc., and Intermec Corporation, such as Astro-Med's QLS-2000 and TEC America's CB416 color printer. More than one printer may be used apply the first and second thermal mass transfer printer images or the first and second thermal mass transfer printer images are applied by a single printer designed to apply more than one colorant/binder. The images are preferably created or reproduced by an electronic device, such as a digital computer, capable of communicating with the printer.

4. Optional second resin-based thermal mass transfer printer image

In a preferred embodiment, a second thermal mass transfer printer image is applied over a portion of the first thermal mass transfer printer image which has a color that preferably contrasts with the color of the first thermal mass transfer printer image. The colorant/binder of the second thermal mass transfer printer image is selected to be compatible with the colorant/binder of the first thermal mass transfer printer image. Spot color colorant/binders are preferred, particularly those intended for use on synthetics, such as vinyl and polyester, and metallized surfaces. The preferences regarding opacity/light transmissivity values specified for the preferred colorant/binders of the first thermal mass transfer printer image and regarding thermal mass transfer printers are also applicable to the second thermal mass transfer printer image. In a preferred embodiment, the colorant/binder for the second thermal mass transfer printer image is an Astro-Med RF ribbon, such as Astro-Med RF black.

Compatibility between the colorant/binder used to apply the second thermal mass transfer printer image and the first thermal mass transfer printer image is determined by determining the print quality grade of printed bar code (i.e., bar code readability) according to The American National Standards Institute (ANSI) Barcode Print Quality Guideline" (ANSX3.182-1990) using a Quick-Check 500 bar code verifier manufactured by PSC, Inc., of Webster, N.Y. (United States) set to have an aperture of 6 mil and a wavelength of 660 nm. The standard assigns a letter grade, "A" through "F", to the bar code based on the lowest letter grade obtained on several different test parameters. A letter grade "C" represents the preferred minimum for compatibility, a letter grade "B" or better (i.e., "B" or "A") represents a more preferred compatibility range and a letter grade "A" represents the most preferred compatibility. These letter grades and letter grade ranges are based on use of printer parameters adjusted to obtain optimum results.

In a preferred embodiment, the letter grades specifically associated with each of "modulation", "defects" and "decode margin" determined by the foregoing test are, independently, "B" or "A", more preferably "A".

To enhance the appearance of the tag and improve on color contrast, the color of the second resin-based thermal mass transfer printer image is preferably of a darker hue than the color of the first resin-based thermal mass transfer printer image, particularly when the first resin-based thermal mass transfer printer image has a color of a lighter hue than the color of the metallized polymer film having a translucent print receptive layer.

5. Optional printing steps

The thermal mass transfer printing step may be preceded or succeeded by other printing processes known in the art, such as ink jet, electrophotographic, flexographic, etc., so long as they do not interfere with the print receptivity of the print receptive layer or the compatibility between the thermal mass transfer printer images. Printing of registration marks on the liner side of the polymer film may be desired to assist in automated registration of the cutting, scoring and/or perforating step with the thermal mass transfer images corresponding to individual labels. The registration marks are preferably added prior to application of the first thermal mass transfer printer image.

In addition, the present invention may include one or more additional thermal mass transfer printer images made with resin-based or wax-based, preferably resin-based, colorant/binder on the translucent print receptive layer and/or on the final resin-based thermal mass transfer printer image.

6. Optional protective coating

After thermal transfer printing, a transparent protective layer may be desired to increase the durability of the thermal mass transfer image(s). Such a transparent protective coating may be applied using means known in the field of labels, such as coating the surface with a liquid polymeric coating composition and then curing or drying that coating to form a solid transparent polymer coating or laminating a transparent polymer film over the thermal mass transfer print image. Useful coating compositions and transparent overlaminate materials are readily available commercially. Liquid varnish may be applied to the surface of the metallized polymer laminate and then cured and transparent overlaminate materials are available as a transparent polymer web having an adhesive backing and a protective release liner which is stripped off before application. The transparent protective layer can be obtained with any desired surface finish, such as matt or glossy, so long as it does not impair bar code readability. Sources of the transparent polymer web with adhesive backing include FLEXcon Company, Inc., for example FLEXcon's A-200 Clear V-344 150 Polyliner, which is a glossy acrylic overlaminate having a thickness of 0.001 inch.

As used herein, the term "transparent" means that the layer as applied has less than 0.5, preferably less than 0.2, and even more preferably less than 0.1, opacity. Preferably, the transparent overlaminate has a light transmissivity of at least 90, more preferably at least 95, and even more preferably at least 98, percent of incident light. Preferably, the overlaminate has a gloss of at least 100, preferably at least 140, Gardner units, measured at a 60 degree angle.

The portion of the laminate in which the first thermal mass transfer printer image does not cover the print receptive layer of the metallized polymer film preferably has a reflectivity greater than 80%, preferably greater than 90%, more preferably greater than 95%, and even more preferably greater than 98% when measured according to Japanese Industrial Standard K 7105. Preferably at least 50 percent, more preferably at least 80 percent and even more preferably at least 90 percent, of the reflectivity of the at least one portion not covered by the first thermal mass transfer image is specular reflectivity as defined in ASTM E 284-81*a*.

The portion of the print receptive layer not covered by the first thermal mass transfer printer image preferably also has an opacity of at least 0.95, more preferably at least 0.98.

7. Cutting scoring and/or perforation

The metallized polymer film containing the printed image (s) may be in the form of a web to facilitate being fed through one or more thermal mass transfer printers. Such a web may be cut, scored, and/or perforated to form individual labels in a manner which is conventional in the art, such as by using a die cut press. Typically, the web is kiss cut after the last thermal printing step and optional application of a transparent protective layer so that individual tags may be removed from the release liner while leaving the release liner intact.

An illustration of the preferred asset tags of the present invention is presented in FIG. 1. FIG. 1 shows a plan view of an asset tag 1, having a first resin-based thermal mass transfer printer image 2 on a metallic polymer film having a print receptive layer 3 as the substrate for the first resin-based thermal mass transfer printer image 2. A second resin-based thermal mass transfer printer image 4 is shown on a portion of the first resin-based thermal mass transfer printer image 2.

Figure 2:
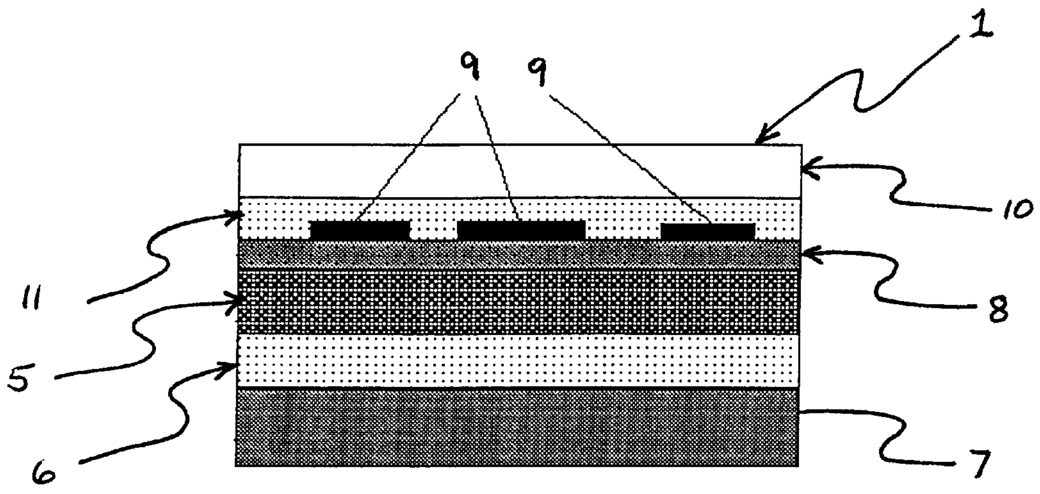

FIG. 2 illustrates an enlarged, expanded, sectional, elevational view of a preferred asset tag of the present invention. The asset tag 1 includes a metallized polyester 5 having on one side a pressure sensitive adhesive 6 and a release liner 7 and on the other side a translucent print receptive layer 8. On the translucent print receptive layer 8 is a resin-based thermal mass transfer printer image 9. Over the translucent print receptive layer 8 and the resin-based thermal mass transfer printer image 9 is an acrylic overlaminate 10 adhered to the translucent print receptive layer 8 and the resin-based thermal mass transfer printer image 9 with an intervening layer of pressure sensitive adhesive 11. As described above, the resin-based thermal mass transfer printer image 9 may comprise a first resin-based thermal mass transfer printer image and a second resin-based thermal mass transfer printer image on a portion of the first resin-based thermal mass transfer printer image.

The present invention is illustrated by the example which follows. This example is not to be construed as limiting the scope of the invention, which is defined by the appended claims.

EXAMPLE

Part 1

FLEXcon's MM500 Silver P/T/P V-88 80B PFM, a silver-colored metallized polyester material having a pressure-sensitive adhesive and liner, is flood coated on the side opposite the adhesive-coated side with CavFlex Plus UV Flexo ink using a flexographic press. The ink is cured using UV light. After printing registration marks on the back side of the web (i.e., on the release sheet), the web stock is slit and wound up on rolls for later use.

Part 2

A roll of the metallized polyester material having the ink coating manufactured in Part 1 of this example is mounted on an Intermec 3440 thermal mass transfer printer having an Astro-Med Silver 3300 4508 thernal transfer ribbon. Computer-generated images are sent to the printer, which prints them onto the ink coating. FLEXcon's A-200 Clear-V344 150 Polyliner is applied over the side of the metallized polyester web having the printed indica as the web exits the printer. Then the web is die-cut to form individual tags on a continuous release sheet by only cutting through the other layers. The resulting tags have a thickness of about 0.013 inch and have the look and feel of anodized aluminum asset tag products.

Although the invention has been described in considerable detail through the preceding specific embodiment, it is to be understood that this embodiment is for purpose of illustration only. Many variations and modifications can be made by one skilled in the art without departing from the spirit and scope of the invention.

What is claimed is:

1. An asset tag having a metallic heft and appearance comprising:

(A) A reflective metallized polymer film having a front side and a back side, the front side optionally having a translucent print receptive layer;

(B) a first resin-based thermal mass transfer printer image applied directly to the front side of the metallized polymer film or the optional translucent print receptive layer and covering a portion of the front side of the metallized polymer film such that at least one portion of the front side of the metallized polymer film is not covered by the first thermal mass transfer printer image; and (C) an optional second resin-based thermal mass transfer printer image applied directly to covering at least a portion of the first resin-based thermal mass transfer printer image such that at least one portion of the first resin-based thermal mass transfer printer image is not covered by the second resin-based thermal mass transfer printer image, wherein the first resin-based thermal mass transfer printer image has a substantially opaque first color and the optional second resin-based thermal mass transfer printer image, when present, has a substantially opaque second color.

2. The tag of claim 1 wherein the metallized polymer film comprises a transparent polymer film having a metal layer, the metal layer having a light transmissivity less than 3 percent.

3. The tag of claim 1 wherein the portion of the metallized polymer film having the translucent print receptive layer, but not the first resin-based thermal mass transfer printer image, has a reflectivity greater than 80 percent.

4. The tag of claim 1 wherein the portion of the metallized polymer film having the translucent print receptive layer, but not the first resin-based thermal mass transfer printer image, has a specular reflectivity greater than 50 percent of the total reflectivity of the same portion of the metallized polymer film.

5. The tag of claim 1 having the optional second resin-based thermal mass transfer printer image and having a printed quality grade of "C", "B" or "A" according to The American National Standards Institute (ANSI) Barcode Print Quality Guideline" (ANSX3.182-1990) conducted at an aperture of 6 mil and a wavelength of 660 nm.

6. The tag of claim 5 wherein the optional second resin-based thermal mass transfer printer image has a modulation grade, defects grade or decode margin grade of "B" or "A", each grade measured according to The American National Standards Institute (ANSI) Barcode Print Quality Guideline" (ANSX3.182-1990) conducted at an aperture of 6 mil and a wavelength of 660 nm.

7. The tag of claim 6 wherein each of the modulation grade, defects grade and decode margin grade is "B" or "A" and at least one of the modulation grade, defects grade or decode margin grade is "A", each grade measured according to The American National Standards Institute (ANSI) Barcode Print Quality Guideline" (ANSX3.182-1990) conducted at an aperture of 6 mil and a wavelength of 660 nm.

8. The tag of claim 1 wherein the metallized polymer film has a color which contrasts with the first color of the first resin-based thermal mass transfer printer image.

9. The tag of claim 1 wherein the metallized polymer film has a print receptive layer comprising a colorant.

10. The tag of claim 1 further comprising a clear protective layer over the first resin-based thermal mass transfer printer image.

11. The tag of claim 1 wherein the metallized polymer film comprises a transparent polymer film having a metal layer, the metal layer having a light transmissivity less than 3 percent; the optional second resin-based thermal mass transfer printer image is present and has a printed quality grade of "C", "B" or "A", a modulation grade of "B" or "A", a defects grade of "B" or "A" and a decode margin grade of "B" or "A", each grade measured according to The American National Standards Institute (ANSI) Barcode Print Quality Guideline" (ANSX3.182-1990) conducted at an aperture of 6 mil and a wavelength of 660 nm.

12. The tag of claim 1 further comprising an adhesive layer on the back side of the metallized polymer film.

13. The tag of claim 12 further comprising a release liner on the adhesive layer.

14. A web comprising a plurality of tags according to claim 1 on a continuous release liner.

15. A process for making an asset tag having a metallic heft and appearance comprising:

(A) Providing a reflective metallized polymer film having a front side and a back side, the front side optionally having a translucent print receptive layer;

(B) Applying a first resin-based thermal mass transfer printer image having a substantially opaque first color directly to the front side of the metallized polymer film (A) or the optional translucent print receptive layer such that at least one portion of the front side of the metallized polymer film (A) is not covered by the first thermal mass transfer printer image; and (C) Optionally applying a second resin-based thermal mass transfer printer image having a substantially opaque second color directly over the first thermal mass transfer printer image (B) such that at least one portion of the first thermal mass transfer printer image (B) is not covered by the second thermal mass transfer printer image.

16. The process of claim 15 including optional step (C).

17. The process of claim 16 wherein the image of optional step (C) includes a printed bar code.

18. The process of claim 17 wherein the printed bar code has a print quality grade of "C", "B" or "A" according to The American National Standards Institute (ANSI) Barcode Print Quality Guideline" (ANSX3.182-1990) conducted at an aperture of 6 mil and a wavelength of 660 nm.

19. The process of claim 18 wherein the optional second resin-based thermal mass transfer printer image has a modulation grade, defects grade and decode margin grade of "B" or "A" and at least one of the modulation grade, defects grade or decode margin grade is "A", each grade measured according to The American. National Standards Institute (ANSI) Barcode Print Quality Guideline" (ANSX3.182-1990) conducted at an aperture of 6 mil and a wavelength of 660 nm.

20. A tag made by the process comprising the steps of:

(A) Providing a reflective metallized polymer film having a front side and a back side; and (B) Applying a first resin-based thermal mass transfer printer image having a substantially opaque first color directly to the front side of the metallized polymer film (A) such that at least one portion of the front side of the metallized polymer film (A) is not covered by the first thermal mass transfer printer image.

21. The tag of claim 20 wherein the metallized polymer film comprises a transparent polymer film having a metal layer, the metal layer having a light transmissivity less than 3 percent.

22. The tag of claim 21 wherein the front side of the metallized polymer film comprises a translucent print receptive layer.

23. The tag of claim 22 wherein the portion of the metallized polymer film having the translucent print receptive layer, but not the first resin-based thermal mass transfer printer image, has a reflectivity greater than 80 percent.

24. The tag of claim 20 wherein the process further comprises the step (C) of optionally applying a second resin-based thermal mass transfer printer image having a substantially opaque second color over the first thermal mass transfer printer image (B) such that at least one portion of the first thermal mass transfer printer image (B) is not covered by the second thermal mass transfer printer image.

25. The tag of claim 20 wherein (the second printer image) comprises a printed bar code.

26. The tag of claim 25 wherein the printed bar code has a print quality grade of "C", "B" or "A" according to The American National Standards Institute (ANSI) Barcode Print Quality Guideline" (ANSX3.182-1990) conducted at an aperture of 6 mil and a wavelength of 660 nm.

27. The tag of claim 25 wherein the printed bar code has a modulation grade, defects grade or decode margin grade of "B" or "A".

28. The tag of claim 20 wherein the metallized polymer film has a color that contrasts with the first color of the first resin-based thermal mass transfer printer image.

* * * * *